US008099380B1

(12) United States Patent
Shahabi et al.

(10) Patent No.: US 8,099,380 B1
(45) Date of Patent: Jan. 17, 2012

(54) BLIND EVALUATION OF NEAREST NEIGHBOR QUERIES WHEREIN LOCATIONS OF USERS ARE TRANSFORMED INTO A TRANSFORMED SPACE USING A PLURALITY OF KEYS

(75) Inventors: Cyrus Shahabi, Irvine, CA (US); Jaffar Khoshgozaran, Pasadena, CA (US); Houtan Shirani-Mehr, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 902 days.

(21) Appl. No.: 12/129,629

(22) Filed: May 29, 2008

Related U.S. Application Data

(60) Provisional application No. 60/940,591, filed on May 29, 2007.

(51) Int. Cl.
*G06F 15/00* (2006.01)
(52) U.S. Cl. .................................... 706/62; 455/456.1
(58) Field of Classification Search ............. 455/404.2, 455/414.2, 440, 456.1, 456.2, 456.3, 456.4, 455/456.5, 456.6, 457; 706/12, 45–48, 62
See application file for complete search history.

(56) References Cited

U.S. PATENT DOCUMENTS

| 7,764,954 | B2* | 7/2010 | Beyer, Jr. ................... 455/416 |
| 2002/0155844 | A1* | 10/2002 | Rankin et al. ................ 455/456 |
| 2003/0050075 | A1* | 3/2003 | Rangarajan et al. .......... 455/456 |
| 2004/0153664 | A1* | 8/2004 | Rossler et al. ................ 713/200 |
| 2008/0182592 | A1* | 7/2008 | Cha et al. ................... 455/456.3 |

OTHER PUBLICATIONS

Ghinita et al., PRIVE: Anonymous Location-Based Queries in Distributed Mobile Systems, Jul. 2006, School of Computing, Singapore, pp. 1-10.*
Khoshgozaran, A., et al., "Blind Evaluation of Nearest Neighbor Queries Using Space Transformation to Preserve Location Privacy," *Proc. of Symposium on Spatial and Temporal Databases*, vol. 4605, pp. 239-257, (2007).

* cited by examiner

*Primary Examiner* — David Vincent
(74) *Attorney, Agent, or Firm* — Fish & Richardson P.C.

(57) ABSTRACT

Systems and techniques are described for blind evaluation of nearest neighbor queries. Locations of multiple users in an original space are received. The locations in the original space are encoded into encoded locations in a transformed space. A relative proximity of the encoded locations in the transformed space is maintained after the encoding. Multiple keys corresponding to the multiple users are generated. Each key enables a reverse transformation of an encoded user location in the transformed space to an original user location in the original space. The multiple keys are provided to the corresponding multiple users, and the encoded locations in the transformed space are provided to a device. An order of computations required to reverse transform the encoded locations in the transformed space to the locations in the original space in the absence of a key is greater than a computational threshold.

25 Claims, 18 Drawing Sheets

| Algorithm 1 CreateIndex (S) |
|---|
| Require: $S = \{o_1, o_2, \ldots, o_n\}$ |
|   1:    Generate SDK = $F(X_0, Y_0, \theta, N, \Gamma)$; |
|   2:    while $(S \neq \Phi)$ do |
|   3:        next POI = S.Get.NextPOI(); |
|   4:        H ← v(nextPoi.X, nextPoi.Y); {Using SDK} |
|   5:        LUT = LUT U H; |
|   6:    end while |

FIG. 3

| Algorithm 2 KNN-Generate (K, $X_q$, $Y_q$) |
|---|
| Require: K, $(X_q, Y_q)$ |
|         H ← $v(X_q, Y_q)$; {Using SDK} |
|   2:    R ← KNN-Resolve(H, K); |
|         while $(R \neq \Phi)$ do |
|   4:        O = R.Get.NextH-Value(); |
|             $\{Poi.X, Poi.Y\} = v^{-1}(O)$; {Using SDK} |
|   6:        Result = Result U Poi; |
|         end while |
|   8:    Result = Sort(Result); |

FIG. 4

Algorithm 3 KNN-Resolve (Π, K)
---
Require: H, K
 find qIndexMore s.t. LUT[qIndexMore] = H; qIndexLess ← qMore-1;
 {starting Point of Search}
 Count ← 0; R ← Φ;
3:  while (Count < K) do
   while (LUT[qIndexMore].HasMoreElem() && (Count<K)) do
     R ← R U LUT[qIndexMore].NextPOI();
     count ++;
   end while
   while (LUT[qIndexLess].HasMoreElem() && (Count<K)) do
     R ← R U LUT[qIndexLess].NextPOI();
     count ++;
   end while
   qIndexMore++; qIndexLess++;
 end while
 return R = {v(o₁), v(o₂), ..., v(o_K)};

FIG. 5

Algorithm 4 Range-Generate $(x, y, n_1, n_2)$
---
Require: $w(x, y, n_1, n_2)$ {The range query}
 1: $w_{runs}$ = FindRuns$(x, y, n_1, n_2)$: {FindRuns returns the runs of w}
 2: result = $\Phi$;
 3: while $w_{runs} \neq \Phi$ do
 4:   run = $w_{runs}$.GetNextRun();
 5:   r=RangeResolve(run);
 6:   while r ≠ $\Phi$ do
 7:     o=r.GetNextH();
 8:     {Poi.X, Poi.Y}=$v^{-1}$(o); {Decodes Each Hilbert value using SDK}
 9:     result = result U Poi;
10:   end while
11: end while
12: return result;

FIG. 8

Algorithm 5 Range-Resolve (run)
---
Require: run {For a run(x, y), we denote x as run.start and y as run.end}
 looUpResult = LUT.ContainsKeys(run.start, run.end);
 2: if (lookUpResult ≠ $\Phi$) then
     while lookUpResult.HasMoreElements() do
 4:     r ← r U lookUpResult.NextPOI();
     end while
 6: end if
     return r;

FIG. 9

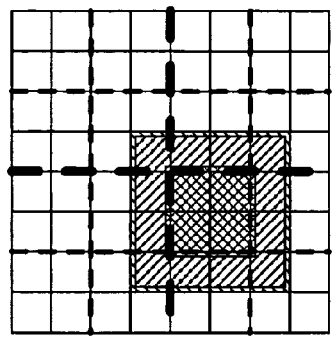
FIG. 10B
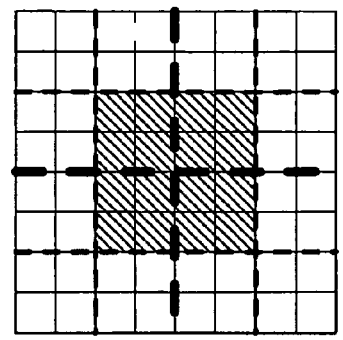
FIG. 10C
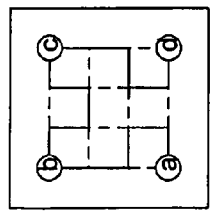
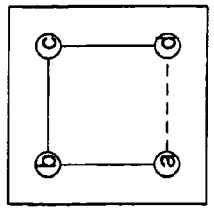
Missed Sides - - - -
FIG. 10A

Precision Vs. Curve Order (N)

Displacement Vs. Curve Order (N)

KNN Response Time Vs. Curve Order (N)

Displacement Vs. K

NN Response Time Vs. K (a) 0.05% Selectivity (b) 0.1% Selectivity (c) 0.5% Selectivity Number of Runs Vs. Hilbert Order for a Query with Different Selectivity

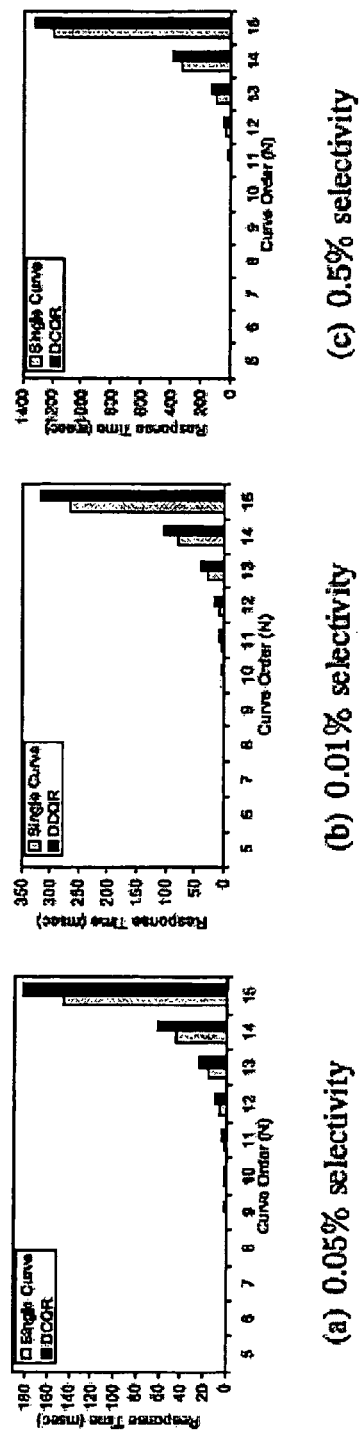

|   | 13 | 14 | 15 | 20 | 25 | 30 |
|---|---|---|---|---|---|---|
| 0.9 | 0.0% | 0.0% | 0.0% | 0.0% | 0.0% | 0.0% |
| 0.99 | 0.0% | 0.02% | 0.0% | 0.01% | 0.0% | 0.0% |
| 0.999 | 0.02% | 0.0% | 0.0% | 0.0% | 0.0% | 0.0% |
| 0.9999 | 0.48% | 0.12% | 0.03% | 0.0% | 0.0% | 0.0% |

(b) $\frac{r}{P}$

FIG. 23B

BLIND EVALUATION OF NEAREST NEIGHBOR QUERIES WHEREIN LOCATIONS OF USERS ARE TRANSFORMED INTO A TRANSFORMED SPACE USING A PLURALITY OF KEYS

CROSS-REFERENCE TO RELATED APPLICATIONS

This application claims priority to U.S. Provisional Patent Application No. 60/940,591, entitled Spatial Encryption: Blind Evaluation of Spatial Queries Using Space Transformation to Preserve Location Privacy to Ali Khoshgozaran and Cyrus Shahabi, which was filed on May 29, 2007. The specification of the above application is incorporated herein by reference in its entirety.

FEDERALLY SPONSORED RESEARCH OR DEVELOPMENT

The US Government may have certain rights in this invention pursuant to National Science Foundation Grant Nos. EEC-9529152 (IMSC ERC), IIS-0238560 (PECASE), and IIS-0324955 (ITR).

BACKGROUND

The present specification relates to K-nearest neighbor query evaluation, for example, using space transformation.

Location-based services (LBS) use one of many fundamental classes of queries, for example, K-nearest neighbor (KNN), range queries, and the like. In such queries, a group of mobile users want to find the location of their K closest objects from a query point (KNN) or all objects located in a certain area of interest (range). These two types of queries are termed Spatial Queries. Evaluating KNN (range) queries may require that the location of the query point (query window) be known in order to perform the query. This, in turn, may require knowledge of a user's location.

SUMMARY

This specification describes technologies relating to blind evaluation of nearest neighbor queries. In one example, a query to identify K nearest neighbors is received from a client. The locations of the client and points of interest are encoded into an encrypted space using space filling curves. Subsequently, the query is resolved and encrypted results are provided to the client, that decrypts the encrypted results.

In one aspect, a method includes receiving locations of multiple users in an original space, encoding the locations in the original space into encoded locations in a transformed space, wherein a relative proximity of the encoded locations in the transformed space is maintained after the encoding, generating multiple keys corresponding to the multiple users, each key enabling a reverse transformation of an encoded user location in the transformed space to an original user location in the original space, providing the multiple keys to the corresponding multiple users, and providing the encoded locations in the transformed space to a device, wherein an order of computations required to reverse transform the encoded locations in the transformed space to the locations in the original space in the absence of a key is greater than a computational threshold.

This, and other aspects, can include one or more of the following features. The method can further include storing the encoded locations in the transformed space. Providing the encoded locations in the transformed space to the device can include providing the device access to the stored encoded locations. The locations are encoded into the transformed space such that a probability that a proximity of the encoded locations in the transformed space is a same as a proximity of the locations in the original space. Providing the multiple keys to the corresponding multiple users can cause the multiple keys to be stored in corresponding secure locations by the multiple users. The multiple keys can be a same key. The method can further include encoding the locations in the original space into encoded locations in the transformed space using Hilbert curve. The computational threshold can be proportional to a curve order of the Hilbert curves. The method further includes generating the multiple keys based on starting points, Hilbert curve orientation, Hilbert curve order, and Hilbert curve scale factor.

In another aspect, a system includes means for receiving locations of multiple users in an original space, means for encoding the locations in the original space into encoded locations in a transformed space, wherein a relative proximity of the encoded locations in the transformed space is maintained after the encoding, means for generating a multiple keys corresponding to the multiple users, each key enabling a reverse transformation of an encoded user location in the transformed space to an original user location in the original space, means for providing the multiple keys to the corresponding multiple users, and means for providing the encoded locations in the transformed space to a device, wherein an order of computations required to reverse transform the encoded locations in the transformed space to the locations in the original space in the absence of a key is greater than a computational threshold.

This, and other aspects, can include one or more of the following features. The system can further include means for storing the encoded locations in the transformed space. The means for providing the encoded locations in the transformed space to the device can include means for providing the device access to the stored encoded locations. The locations are encoded into the transformed space such that a probability that a proximity of the encoded locations in the transformed space is a same as a proximity of the locations in the original space. The means for providing the multiple keys to the corresponding multiple users can include means for causing the multiple keys to be stored in corresponding secure locations by the plurality of users. The multiple keys can be a same key. The system can further include means for encoding the locations in the original space into encoded locations in the transformed space using Hilbert curves. The computational threshold can be proportional to a curve order of the Hilbert curves. The system can further include means for generating the multiple keys based on starting points, Hilbert curve orientation, Hilbert curve order, and Hilbert curve scale factor.

In another aspect, a system includes an encoding device configured to encode locations of multiple users in an original space into encoded locations in a transformed space, generate a key to enable a reverse transformation of an encoded user location in the transformed space to an original user location in the original space, provide the key to each user of the multiple users, and provide the encoded locations in the transformed space. The system also includes a server configured to receive the encoded locations in the transformed space, receive a query from a user to identify one or more nearest users, the user and the one or more nearest users included in the multiple users, resolve the query to identify locations in the transformed space of the one or more nearest users based on a location in the transformed space of the user, and provide the identified locations to the user.

This, and other aspects, can include one or more of the following features. The query can be a K-nearest neighbor (KNN) query, and the server can be configured to resolve the KNN query using a Hilbert curve. The query can be a two-dimensional (2-D) range query, and the server can be configured to resolve the 2-D range query by transforming the 2-D range query into multiple one-dimensional (1-D) ranges in the transformed space. The server can be configured to resolve the query using a dual curve obtained by replicating a Hilbert curve. The Hilbert curve can be rotated and shifted to obtain the dual curve. The Hilbert curve can be rotated by 90 degrees. The Hilbert curve can be shifted by one unit in both X and Y directions.

Particular implementations of the subject matter described in this specification may provide one or more of the following advantages. The range and KNN queries can be performed without revealing any location information, thereby preserving a client's privacy. The location information of the query and all points of interest can be encoded and the spatial queries can be resolved blindly. By utilizing space-filling curves as one-way transformations to encode the locations of both the client and the points of interest to evaluate a query, a need for an intermediator between a client and a server resolving a query can be eliminated. The KNN query algorithm described here can provide constant computation and communication complexity while providing a very close approximation of the original query results. Further, the KNN query computation complexity can be reduced from $O(K \times (2^{2N}/N))$ to $\theta(K)$, where N and n are the Hilbert curve order and total number of objects, respectively. A malicious attacker, who seeks to obtain the client's location information, can obtain almost no useful information about the parameters of the encoding techniques.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

FIG. 3 is an example algorithm 1 detailing the offline space encryption process.

FIG. 4 is an example algorithm 2 showing the KNN-Generate module taking place while responding to a user's KNN query.

FIG. 5 is an example algorithm 3 to resolve a query using LUT.

FIG. 8 is an example Range-Generate algorithm.

FIG. 9 is an example Range-Resolve algorithm.

FIG. 10A is an example of a $1^{st}$ degree Hilbert curve.

FIG. 10B is a range query including four strips.

FIG. 10C shows a range query with no strips.

FIG. 22 show the running time of the range query algorithms.

FIG. 23A shows the result of performing the KNN-CreateIndex Module.

FIG. 23B shows a case where the malicious location server knows the exact values of $X_0$, $Y_0$, $\theta$, and N.

Like reference numbers and designations in the various drawings indicate like elements.

DETAILED DESCRIPTION

Figure 1:
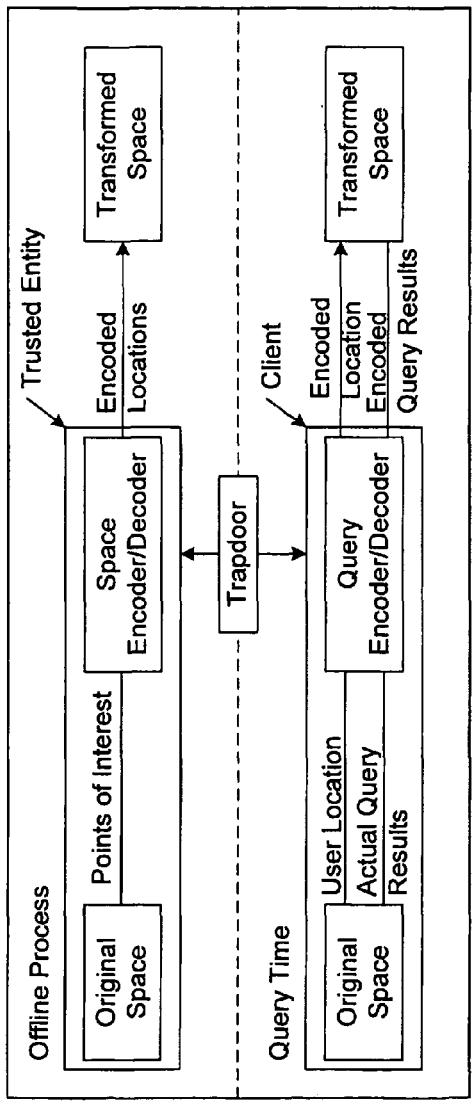
FIG. 1 is a schematic of an example sequence for space encoding.

Systems and techniques to perform the class of Range and Nearest Neighbor (NN) queries are described. These queries represent the core class of spatial queries used in location-based services. The systems and techniques perform these queries without revealing any location information about the query in order to preserve users' private location information. In some implementations, the power of one-way transformations is utilized to map the space of all static and dynamic objects to another space and resolve spatial queries blindly in the transformed space. The described methods include methods to evaluate KNN and range queries privately in the Hilbert transformed space. In some implementations, an approximate KNN algorithm has $\theta(K)$ computation and communication complexity and an exact range algorithm take $O(n_1 \log T)$ time where $n_1 = \max(n_1, n_2)$ for a query of size $n_1 \times n_2$ and $T = 2^N$ for N being the Hilbert curve order.

The problem of blindly evaluating a KNN or a range query is formally defined and its use of one-way transformations is discussed. Also, a review of an important class of many-to-one dimensional mappings, called space filling curves, is reviewed. Such space filling curves are used to achieve location privacy.

Formal Problem Definition

A set of static objects $S=\{o_1, o_2, \ldots, o_n\}$ in 2-D space and a set of users $U=\{u_1, u_2, \ldots, u_M\}$ in an area A which can be represented as a set of discrete locations $A=\{l_1, l_2, \ldots, l_{2^{2N}}\}$ is considered. The area, A, is discretized into a grid of $2^N \times 2^N$ cells. The KNN query with respect to query point $q_i$ finds a set $S' \subset S$ of K objects where for any object $o' \in S'$ and $o \in S-S'$, $D(o', q_i) \leq D(o, q_i)$ where D is the Euclidean distance function. Similarly, a range query returns all objects that fall inside a rectangular query window represented as $w(x, y, n_1, n_2)$ where x and y are the coordinates of the lower left corner of the window, and $n_1$ and $n_2$ are the height and width of the window query, respectively. Range and KNN queries constitute the dominant queries performed in location-based services, and are referred to as spatial queries. In some spatial query scenarios, the static objects represent points of interest (POI) and the query points represent user locations. Privacy metrics can be proposed and extended to allow modeling the information leak where perfect privacy is not achievable.

Definition 1: u-anonymity

While resolving a spatial query q, the user issuing the query is indistinguishable among the entire set of users. In other words, for each query q, $P_q(u_i)=1/M$, where $P_q(u_i)$ is the probability that query q is issued by the user $u_i$ and M is the total number of users. Therefore, if a spatial query is not performed u-anonymously, the server can assign higher probability to one or a subset of users as possible issuers of the query. Since u-anonymity is defined as a binary property, the notion of entropy in information theory is used to measure how well an adversary can predict the identity of the query issuer in the absence of u-anonymity. In some scenarios, u-entropy for a spatial query q is defined over the probability distribution $P(u_i)$ as shown in Equation 1.

$$u - entropy_q = -\sum_{i=1}^{M} P_q(u_i)\log(P_q(u_i))_l(u_i) \quad (1)$$

It can be verified that if u-anonymity is satisfied, u-entropy achieves maximal value of log M. However, if an adversary uses information obtained from the unprotected result of a spatial query to infer that the query is not clearly issued by half of the users in the system, the u-entropy decreases to log M−1, as shown in Equation 2.

$$u - entropy_q = -\sum_{i=1}^{\frac{M}{2}} \frac{2}{M}\log\left(\frac{2}{M}\right) = \log M - 1 \quad (2)$$

In this example, the difference between maximal entropy and the u-entropy in Equation 2 is the amount of information leaked to the adversary. A u-entropy of zero indicates that the adversary knows for certain, the issuer of the query. Note that u-anonymity ensures that the server does not know which user queried from a point $l_j$. In order to ensure that the server does not know which point the query q is issued from, a second metric is used.

Definition 2: a-anonymity:

While resolving a spatial query q, the location of the query point is not revealed. In other words, for each query q, $P'_q(l_i)=1/|A|$, where A is the entire region covering S and $P'_q(l_i)$ is the probability that query q was issued by a user located at the point $l_i$ inside A. Similar to u-entropy, a-entropy is defined to capture how well the adversary can locate the origination point of the query q if a-anonymity is not satisfied. The metric, a-anonymity, is equivalent to the maximal value of a-entropy, i.e., log |A|.

$$a - entropy_q = -\sum_{i=1}^{2^{2N}} P'_q(l_i)\log(P'_q(l_i)) \quad (3)$$

It can be verified that the amount of information leaked to an adversary in K-anonymity based approaches is log(M/K).

Protecting users' location information requires protecting users' identity as well as their location, simultaneously. The metrics, u-anonymity and a-anonymity, are defined to capture two inherently different natures of user's private location information where satisfying only one, does not guarantee perfect location privacy. For example, knowing a user's identity while protecting user's location enables a malicious server to match the user's personal information, for example, phone number, name, and the like, with a publicly available database to locate user's residence or work place, which has a high probability of being the user's current location. This violates the u-anonymity constraint. Alternatively, protecting users' identities and not their locations enables the malicious server to trace their location information through several stationary connection points, for example, cell towers. After a while, users leave a trail of packet crumbs which could be associated to a certain residence or office location, thereby enabling determining users' identities. Several other types of surprising private information can also be revealed by just observing anonymous users' movement and usage pattern over time.

Further, frequent change of pseudonyms are used as a way of protecting user's identity. This may not be enough if a server has access to users' locations for a certain period of time. However, by obfuscating users' locations, an attacker is prevented from inferring original user locations and thus linking two pseudonyms to the same user. Besides using pseudonyms for hiding users' identities, techniques are described mainly for hiding users' location information. Furthermore, hiding a user's location can be more challenging than hiding the user's identity because, in LBS, the location of the user is part of the query itself, while the identity is not necessary to evaluate the query.

In addition to protecting users' identities and locations, protecting the result set of spatial queries from a malicious entity can also be important. In an example where one user issues a 1 NN query, the server returns the closes object $o_i$ to the unknown user's location. By only knowing the query result set $o_i$ and the distribution of other objects in space, the server can significantly reduce the possible user positions to the Voronoi cell whose generator is $o_i$. Therefore, failing to hide the results of spatial queries might easily lead to an information leak in the form of low a-entropy.

Definition 3: Blind evaluation of spatial queries: A spatial query is blindly evaluated if the u-anonymity and a-anonymity constraints defined above are satisfied. Alternatively, both u-entropy and a-entropy achieve their maximum values. In other words, in blind evaluation of spatial queries, the identity and location of the query point should not be revealed. The approach is termed blind evaluation of spatial queries because it attempts to prevent any information leakage to essentially prevent the server from finding users' location or identities.

In some implementations, "user" refers to a client subscribed to a location-based service located at point i issuing the query q. The following example shows how the above properties should be satisfied in a typical KNN query. Suppose a user asks for his three closest gas-stations. In this case, the untrusted location server, that will identify the closest gas-stations, should acquire neither the location of the user (i.e., a-anonymity) nor the user's identity (i.e., u-anonymity) nor the actual location or identity of any of the three gas stations in the query result set. Based on the above properties, a location server is termed privacy aware if it is capable of blindly evaluating spatial queries while providing accurate results. The challenge in blind evaluation of spatial queries is that the above two constraints should be met simultaneously. The notion of encoding the space to guarantee perfect privacy while responding to location-based queries is described below.

Space Encoding

This section describes an approach to protecting user's location from the malicious location servers by transforming the static objects to a new space using a locality-preserving one-way transformation and also addressing the transformed query in this new space. The issue of location privacy is addressed in the context of location-based services. Thus, the focus is on the 2-D space of static objects, i.e., points of interest, and dynamic query points, i.e., users. To map each point from the original space to a point in the transformed space, a one-way function is used. This prevents the server from obtaining the original results by reversing the transformation. A transformation is one-way if it can be easily calculated in one direction, for example, the forward direction, and is computationally impossible to calculate in the other direction, for example, the backward direction.

FIG. 1 is a schematic of an example sequence for space encoding. FIG. 1 includes a space encoder/decoder and a query encoder/decoder. Any one-way transformation that respects the proximity of the original space between points of interest can be used as the encoders/decoders in FIG. 1 to make the location server privacy aware. Transforming the original space with such a locality-preserving one-way mapping can be viewed as encrypting the elements of the 20D space using a one-way transformation. Some one-way transformations can be reversed even without the knowledge of the trapdoor that enables one-way transformation. However, the process must be too complex to make such transformation computationally secure. In some implementations, the properties of the mapping function as the trapdoor are provided only to the users to enable the users to reverse the encoded results and get the response set back in the original format.

Accuracy Metrics

In some implementations, the approach for KNN queries generates an approximation of the actual result due to the reducing of the dimensionality of data. Evaluating the range queries in the transformed space is different due to the fact that the results are not approximated, but instead, generate a superset of the query results. Therefore, space encodings that provide a close approximation of the actual query results in the transformed space are desired. Another metric, namely, closeness, is defined as a measure to evaluate the effectiveness of the approximation techniques for spatial queries.

Definition 4: Suppose the result of a spatial query, issued by a user located at point $l_i$ evaluates to $R=(o_1, o_2, \ldots, o_K)$ in the original space and to $R'=(o'_1, o'_2, \ldots, o'_K)$ in a space created by the transformation T of the original space. T is an effective locality preserving transformation if R' yields acceptable values for the following metric:

Metric 1: Precision and Recall—Measuring what fraction of the points retrieved are relevant (Precision) and what fraction of the relevant points are retrieved (Recall). These metrics are defined in Equation 4 (|R| denotes the cardinality of the set R).

$$\text{Precision} = \frac{|R \cap R'|}{|R'|}, \quad \text{Recall} = \frac{|R \cap R'|}{|R'|} \qquad (4)$$

Note that for all KNN queries |R|=|R'| since the approximate KNN algorithm returns the same number of points as performing the query in the original space, the metric, recall, will equal precision for such queries. With regards to range queries, $R \subseteq R'$ since the proposed algorithm always returns a superset of the result set. This means that recall is always 100%. Therefore, in some implementations, only precision is used to evaluate the accuracy of spatial queries. Since the KNN algorithm approximates the query results, a second accuracy metric is used for the KNN algorithm. This accuracy metric is not used for approximation in range queries.

Metric 2: Displacement—Measuring how closely R is approximated using R' using the KNN algorithm:

$$\text{Displacement} = \frac{1}{K}\left(\sum_{j=1}^{K} \|l_i - o'_j\| - \sum_{j=1}^{K} \|l_i - o_j\|\right) \qquad (5)$$

In Equation 5, $\|l_i - o_j\|$ is the Euclidean distance between the fixed query point and an object $o_j$. Because R is the ground truth, displacement $\geq 0$. After applying a filtering step, R=R' for the range queries and hence displacement evaluates to zero.

Although there is no fixed threshold for acceptable values of the above metrics, depending on the application and the scenario, certain values may or may not be considered satisfactory.

Space Filling Curves

An important class of transformations called space filling curves are described and their suitability as candidate space encoders is explained. The properties of such space filling curves whereby certain properties of the curves are kept secret from malicious attackers is also shown. Space filling curves belong to a family of curves which pass through all points in space without crossing themselves. An important property of these curves is that they retain the proximity and neighboring aspects of data. Consequently, points which lie close to one another in the original space mostly remain close to each other in the transformed space. One of the popular members of this class are the Hilbert curves.

An $N^{th}$ order Hilbert curve for a d-dimensional space is defined as follows:

$H_d^N$ for $N \geq 1$ and $d \geq 2$ $H_d^N$ is a linear ordering which maps an integer set $[0, 2^{Nd}-1]$ into a d-dimensional integer space $[0, 2^N-1]^d$ as follows.

$H=v(P)$ for $H \in [0, 2^{Nd}-1]$ where P is the coordinate of each point in the d-dimensional space. The output of this function is called the function's H-value. It is possible for two or more points in a given curve to have the same H-value.

Figure 2:
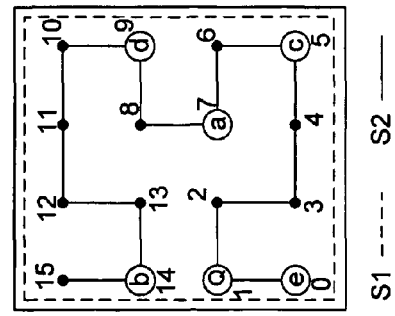
FIG. 2 is an example scenario showing a Hilbert curve to transform a 2-D space into H-values.

FIG. 2 is an example scenario showing a Hilbert curve to transform a 2-D space into H-values. In the example scenario of FIG. 2, points of interest (POI) are traversed by a second order Hilbert curve and are indexed based on the order they are visited by the curve, i.e., H in the above formula. Therefore, the points a, b, c, d, and e are represented by the H-values 7, 14, 5, 9, and 0, respectively. In some implementations, the query can be resolved based on the resolution shown in FIG. 2, while, in other implementations, more fine-grained curves can be recursively constructed. When used in location-based services, Hilbert curves act as locality preserving transformations with satisfactory values of precision and displacement. Further, in the Hilbert curve, v can be viewed as a one-way function if the curve parameters are not known. These parameters, which collectively form a key for this one-way transformation, include the curve's starting point $(X_0, Y_0)$, curve orientation $\theta$, curve order N and curve scale factor $\Gamma$. This key is called Space Decryption Key or SDK where SDK={$X_0, Y_0, \theta, N, \Gamma$}.

Theorem 1: The transformation H=v(X, Y) is one-way without knowing the Space Decryption Key.

PROOF: A Hilbert curve of order N indexes a $2^N \times 2^N$ grid whose starting point lies on the intersection of the lines $X=X_0$ and $Y=Y_0$. Therefore, assuming a square region covering all POIs, the entire search space for the grid cell that contains the starting point will have $2^{2N}$ elements. Furthermore, the exact position of the starting point in that grid cell should also be found. Let the continuous space in a single cell be discretized into c×c sub-cells. Therefore, the attacker has to search in the space of $2^{2n} \times c^2$ sub-cells for the one containing the starting point. Note that $c \geq 1$ and therefore, the lower bound for the complexity of finding the curve's starting point is $O(2^{2N})$. Using a similar argument for discretization of the continuous space for $\theta$ and $\Gamma$, the entire solution space will have $2^{2N} \times 2^N \times 2^N$ elements (where the last two correspond to the space of valid $\theta$ and $\Gamma$ values). Hence the complexity of a brute-force attack will be $O(2^{4N})$. Consequently, increasing N results in an exponential complexity growth for reversing the H=v(X, Y) mapping, and thus N can be chosen large enough to make H act as a one-way mapping. This transformation is considered a space encryption scheme whose key is the curve parameters, i.e., SDK.

Therefore, a malicious entity, not knowing this key, has to exhaustively check for all combinations of curve parameters and check each guess by comparing the obtained H-values for all points of interest with their actual H-values. In order to perform such an exhaustive search, the attacker has to obtain precise values for all of the above parameters. Even a nominal error in approximating curve parameters will generate a completely different set of H-values.

Theorem 2: Using an $H_2^N$ Hilbert curve to encode the space satisfies the a-anonymity and u-anonymity properties defined previously.

PROOF: Suppose a spatial query q originated at a point $l_i$. Theorem 1 states that having the H-value of $l_i$, one cannot reverse the process to find $v^{-1}(l_i)$ because v is a one-way transformation, and thus $$P'_q(l_i) = \frac{1}{2^{2N}} = \frac{1}{|A|}$$

Furthermore, since no user identity or location information is required to resolve q, it can be issued by any user $u_i$ and thus $$P(u_i) = \frac{1}{M}$$

$$\frac{2^{2p}}{2^{2N}} = \frac{1}{|A|}$$

where M is the total number of users.

Location Query Processing

In some implementations, making a query processing engine privacy-aware based on the space transformation discussed previously can be performed by a two-step process consisting of an offline encryption of original space followed by online query processing.

Offline Space Encryption

FIG. 3 is an example algorithm 1 detailing the offline space encryption process. The first step of this phase is to choose the curve parameters from which the curve will be constructed and the value of SDK will be determined. Next, assuming the entire area covering all points of interest is a square $S_1$, an $H_2^N$ Hilbert curve is constructed starting from $(X_0, Y_0)$ in a (possibly larger) square $S_2$ surrounding $S_1$ until the entire $S_2$ is traversed (see FIG. 2). After visiting each point P, its H-value=v(P.X, P.Y) is computed using SDK. An efficient bitwise interleaving algorithm can be used to compute the H-values for points of interest (depending on the implementation, the cost of performing this operation varies between $O(n)$ and $O(n^2)$ where n is the number of bits required to represent a Hilbert value). This process is performed once for all points of interest and thus at the end of this step, a look-up table LUT which consists of H-values for all POIs is constructed. Note that the size of LUT only depends on the number of POIs to be indexed and not the size of the region in which they are located. The result of applying Algorithm 1 on the example from FIG. 2 looks like the following look-up table: LUT={(0), (5), (7), (9), (14)} where each element is the point's index in the curve (i.e., its H-value).

Given a set S of n static objects, let ρ represent the average number of objects with the same H-value in LUT. For a Hilbert curve of order N, $\rho = n/2^{2N}$. Indexing the objects with a lower degree curve is analogous to using a coarse-grained grid. Therefore, using a small N (a large ρ) has a negative effect on precision and displacement metrics previously defined. Similarly, larger values of p increases the average number of excessive objects included in the range query result set (originated from the extra objects in the cells partially overlapping with the query window). Hence, for a given dataset, we increase N until p becomes smaller than a threshold.

Online Query Processing—KNN

Using the LUT, the KNN queries are blindly evaluated in the transformed space. FIG. 4 is an example algorithm 2 showing the KNN-Generate module taking place while responding to a user's KNN query. For each query point q located at position $(X_q, Y_q)$, KNN-Generate uses SDK to compute H=v($X_q, Y_q$). The value of H, along with K (i.e., the number of desired nearest neighbors), is then sent to KNN-Resolve.

FIG. 5 is an example algorithm 3 to resolve a query using LUT. Both directions are searched in the LUT, starting from v($X_q, Y_q$) until K closest matches are found. These matches are K encoded objects whose H-values are part of the result set. Knowing SDK, KNN-Generate uses $v^{-1}$ to transfer the result set back to the original 2-D space. To illustrate, in the example of FIG. 2, having K=3, and q=(2, 0), KNN-Generate computes H=4=v(2, 0) and calls KNN-Resolve(4, 3) to obtain R={(0), (5), (7)}. Next, $v^{-1}$ is applied to all the above H-values to obtain their original 2-D coordinates.

The complexity of the KNN-Resolve module which represents the overall KNN query processing complexity can be derived. In some scenarios of implementation of the KNN algorithm, a linear increase of the curve order would dramatically increase the query complexity as every Hilbert value on either side of the query point had to be traversed until K objects were found. However, in some implementations, by searching LUT instead of the curve itself, all H-values that do not contain any objects can be skipped. In other words, only Hilbert values that contain at least one object are visited. Otherwise the H-value would not exist in LUT. Therefore, Algorithm KNN-Resolve visits at most $\theta(K)$ entries in LUT which reduces the running time of KNN-Resolve to constant time (since $K \ll 2^{2 \times N}$). Furthermore, the communication complexity is determined by average number of objects read and transferred to the user which is ρ×K also being constant since ρ≈1.

Online Query Processing—Range

During the above-described offline process, the objects in the original space are encoded and their H-values are stored in LUT. One approach to answer a 2-D range query $w(x, y, n_1, n_2)$ is to transform it to a series of 1-D ranges in the Hilbert transformed space and the challenge is how to do this transformation efficiently and accurately.

Figure 6:
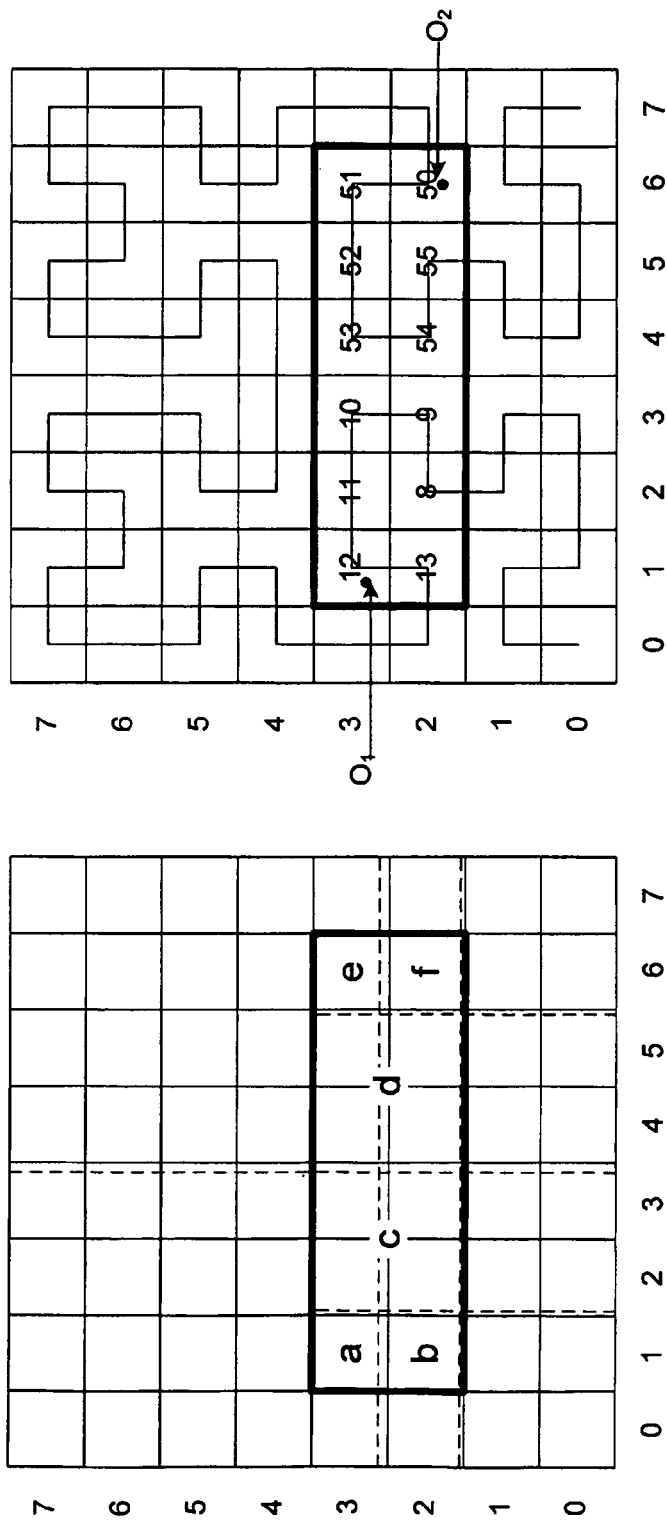
FIG. 6 is an example of a range query w(1, 2, 2, 6).

FIG. 6 is an example of a range query w(1, 2, 2, 6). The result of this query contains the highlighted objects $O_1$ and $O_2$ in FIG. 6 whose H-values are contained in w(1, 2, 2, 6). As FIG. 6 illustrates, w(1, 2, 2, 6) can be transformed into two 1-D range queries one with objects whose H-values range from 8 to 13 and another one for objects whose H-values range from 50 to 55. Each of these 1-D range queries is called a range query run or a query run for short. These runs are highlighted in FIG. 6. The result of the range query consists of objects whose H-values belong to any of these two runs ($O_1$ and $O_2$ with H-values 12 and 50 in the running example).

Finding the Range Query Runs

To find the range query runs, the first step is to decompose the input range query into a set of square blocks according to the quadtree decomposition. During this process, the grid space is recursively divided into four equal partitions until a partition is completely contained in the range query. As shown in FIG. 6, the square labeled "c" is obtained after two recursions while acquiring the squares "a" and "b" need a third recursion. After decomposing the range query into a set of square blocks according to the quadtree decomposition, the resulted square blocks are named maximal quadtree blocks or maximal blocks for short. An interesting property of maximal blocks is that the H-values inside a maximal block form a continuously increasing sequence. The minimum and the maximum H-values of the sequence are denoted as $h_b$ and $h_e$, respectively. The values of as $h_b$ and $h_e$ can be found efficiently, thereby finding all the H-values inside a maximal block. A maximal block is denoted as MB (x, y, s) where (x, y) and s are the lower left coordinate and the side length of the maximal block, respectively. For instance, as shown in FIG. 6, MB(2, 2, 2) is a maximal block of the range query w(1, 2, 2, 6) whose H-values form a continuously increasing sequence with $h_b$=8 and $h_e$=11. Each sequence is denoted as a pair in the form ($h_b$, $h_e$). Hence, the H-values inside MB(4, 2, 2) can be denoted as (52, 55).

To find the maximal blocks of a range query, we use the strip splitting based optimal algorithm. The algorithm can find the maximal blocks of a w(x, y, n1, n2) range query in $O(n_1)$ time where $n_1$=max($n_1$, $n_2$). The idea is to repeatedly split a strip of maximal blocks from the sides of the range query. After decomposing the range query into a set of maximal blocks, the values of $h_b$ and $h_e$ are found for each maximal block. The H-values obtained from the maximal blocks of a range query form a sequence called Seq. for example, the range query in FIG. 6 results in the following sequence: Seq={(13, 13), (12, 12), (50,50), (51, 51), (8, 11), (52, 55)}

The H-values in Seq generated by the strip-based decomposition algorithm may not be in increasing (or decreasing) order. Therefore, the H-values in Seq are sorted and denoted as Seq*. With Seq*, adjacent pairs which belong to the same run can be merged in order to decrease the total number of runs and instead, increase their length. A pair p in Seq* can be merged with its successor q, if and only if the difference between $h_b$ of q and $h_e$ of p is one. The sequence obtained by merging the elements of Seq* constitute the runs of the range query and the sequence is denoted as runs(w). For the above example, runs(w) is as follows: runs(w)={r(8, 13), r(50, 55)}.

Each element of runs(w) is a run in the original range query consisting of H-values from x to y denoted as r(x, y). For example, in FIG. 6, the query has two runs: runs(w)={r(8, 13), r(50, 55)}. Sorting and merging the H-values greatly reduce the number of range query runs. For example, a 74% reduction in number of runs for 200,000 range queries with various side lengths was achieved.

While evaluating a range query, all cells that overlap with the query window need to be included. As some of these cells only partially overlap with the query, this process might introduce some excessive objects in the query result set. It will be shown that excessive objects constitute a marginal fraction of the objects retrieved from LUT and therefore can be easily filtered by the users without affecting the client/server communication cost.

The time complexity of the quadtree decomposition algorithm is now discussed. The process to find the range query runs $w(x, y, n_1, n_2)$ consists of four parts: (1) decomposing w into its maximal blocks, (2) finding the value of $h_b$ and $h_e$ for each maximal block and forming the set Seq, (3) sorting the elements of Seq and forming Seq*; and (4) merging the elements of Seq* and forming runs(w). The first step can be done in $O(n_1)$ as discussed earlier. The second step can be done in $O(n_1 \log T)$ where $T=2^N$ for N being the curve order. The third step can be done in $O(n_1 \log n_1)$ using a sorting algorithm such as quick sort. Finally, the fourth step can be done in $O(n_1)$. Consequently, the total running time to find the range query runs $w(x, y, n_1, n_2)$ is $O(n_1 \log T)$. The last step of the range query processing is to retrieve relevant objects from LUT. There are on average $n_1 \times n_2 \times \rho$ many objects in a range query of size $n_1 \times n_2$ which results in equal number of reads from LUT. This algorithm can be used to evaluate a range query blindly.

Making a Range Query Privacy-Aware

Directly applying the quadtree decomposition algorithm discussed above might leak important information about the location of the query to a malicious server. This clearly violates the a-anonymity constraint and can lead to unsatisfactory a-entropy. Therefore, an approach is proposed to prevent any information leakage from processing range queries. The range queries are assumed to be in the form of arbitrary squares. This is a reasonable assumption from the practical point of view as in most cases users are issuing range queries in the form of squares or rectangles with almost equal side lengths.

Sending a request to the server in the form of a single SQL SELECT statement with multiple predicates, where each predicate corresponds to a range query run, allows the adversary to obtain information about the range query size by utilizing the following inference attack. First, the adversary (e.g., the server) infers the side length of a range query from the number of runs in the query window. It will be shown that the side length of range query is highly correlated with the number of query runs. Furthermore, the server can gain access to the overall distribution of the POIs in the original 2-D space (usually being publicly available). Finally, the malicious server can also find the number of objects in the query result set by calculating the cardinality of the set containing the encrypted objects returned. Since the POIs are usually not uniformly distributed, knowing the fact that a range query issued with the approximate size of sxs contains n POIs in its result can help the adversary to prune parts of the space in locating the query issuer. For example if the result of a small range query contains many POIs, the adversary infers that the query issuer must have issued the query from a populated area.

To show how the side length of range query is highly correlated with the number of query runs, the notion of correlation coefficient from statistics is used to measure the relationship between these two variables. The correlation coefficient is measured by generating 500,000 random range queries and measuring $r_{XY}$ where X=range query side length and Y=number of query runs. It was observed that $r_{XY}$~0.88 showing that the square query side length is highly correlated with the number of query runs. Therefore, knowing the number of runs in the range query, the adversary can estimate the range query side length with high probability.

Figure 7:
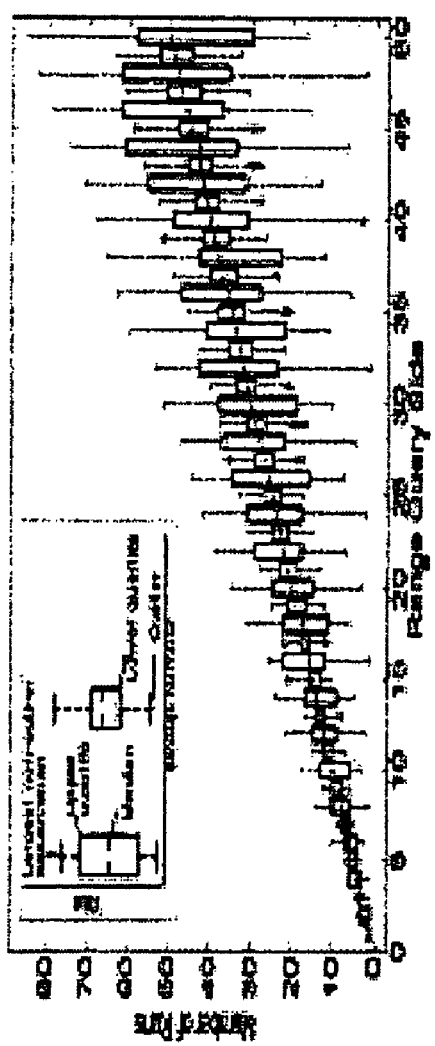
FIG. 7 is an example boxplot.

FIG. 7 is an example boxplot resulting from the experiment setting described above for measuring the correlation coefficient between the two variables X and Y. The boxplot in FIG. 7 is drawn for query side lengths of up to 50 and shows how the average number of runs of a query is linearly correlated with the range query side length. Consequently, in order to prevent the above inference attack, each query can be run separately to the server. When the server receives a query run, the only information it gets from a run is its length. To show that the length of a single run cannot reveal any information about the range query, an experiment similar to that discussed above was performed to compute the correlation between the size of each query run and the query side length. Measuring the correlation coefficient between these two random variables for different Hilbert curve orders resulted in a very small correlation of $r_{X,Y}$~0.08, which means that the server cannot get any information from individual runs of a query. Using this technique, for the range query in FIG. 6, the server receives two independent requests for r(8,13) and r(50,55).

Online Range Query Processing Modules

Two modules involved in online range query processing are called Range-Generate and Range-Resolve. FIGS. 8 and 9 are example Range-Generate and Range-Resolve algorithms, respectively. For each range query $w(x, y, n_1, n_2)$, Range-Generate first finds the runs of w by calling FindRuns $(x, y, n_1, n_2)$. FindRuns has been previously described. For each run, the Range-Resolve module finds all objects whose H-values lie in the run. It then transfers the objects in the query result from the encrypted space to the original 2-D space using SDK and $v^{-1}$ and generates the actual query result set.

Dual Curve Query Resolution

In some implementations, a Dual Curve Query Resolution (DCQR) approach is used to solve range and KNN queries.

KNN Queries: Proximity in Hilbert Curves FIGS. 10A-C are example Hilbert curves. Two properties of Hilbert curves affect the performance of the KNN algorithm described previously. First, consider the $1^{st}$ degree curve shown in FIG. 10A. The curve is constructed by traversing a U-shaped pattern. Regardless of its orientation, such a curve fills the space at a specific direction at any given time, sweeping the space in a clockwise fashion. Starting from the first degree curve of FIG. 10A, the curve misses one side in its first traversal. As the curve order grows, the number of missed sides grows exponentially as well so that an $H_2^N$ curve misses $M=2^{2N}-2^{N+1}+1$ sides of a $(2^N-1)\times(2^N-1)$ grid. The above property makes H-values of certain points farther as N increases. For instance, the Euclidean distance between points a and d is similar to that of the points b and c in the original 2-D space. However, as N grows, due to the above property, the difference between the H-values of a and d grows exponentially larger than that of b and c. Therefore, points closer to two quadrants of the space, i.e., the first and last quadrants filled by the curve) will be spatially furthest from one another in the transformed space.

Secondly, using a single Hilbert curve for KNN queries reduces the dimensionality of the space from 2 (or in general, N) to 1. Each element in the 1-D space constructed by the Hilbert curve will have two nearest neighbors compared to the original case where each element, except those at the edges, has four (or in general case, 2N) nearest neighbors. In some scenarios, only half of the nearest neighbors in 2-D space will remain a nearest neighbor of the same point in the transformed 1-D space. This may reduce the quality of the result set given KNN's sensitivity to how the underlying index structure preserves object proximity.

Range Queries: The Number of Query Runs

As described previously, a range query is blindly evaluated by generating the range query runs and looking up LUT for all encoded objects whose H-values are located inside each run. Therefore, each query is translated into several look-up requests performed on LUT. The LUT is owned by the server. Therefore, when multiple users issue range queries, the server's throughput can be adversely affected by the huge number of requests received from the users, each request corresponding to a run. Thus, it may be desirable to reduce the number of runs in a range query.

Given a range query $w(x, y, n_1, n_2)$, assume x and y to be odd and $n_1$ and $n_2$ to be even numbers. The range query has four strips each consisting of only maximal blocks of size 1×1, i.e., four strips intersecting in the four corners of the range query. An example is shown in FIG. 10D for w(1, 1, 4, 4), where strips consist of 12 1×1 maximal blocks. It can be verified that if at least one of x and y becomes even, while $n_1$ and $n_2$ remain the same, the number of maximal blocks decreases substantially as some of the strips disappear. For example, FIG. 10C shows both x and y are even numbers and there are no strips in the range query. Range query runs are obtained by merging the H-values resulting from maximal blocks of the range query. This indicates that larger number of maximal blocks result in more query runs. Thus, a technique that reduces the number of maximal blocks will consequently result in less number of query runs.

To increase precision and reduce server overhead for range queries, a dual curve is used. The dual curve is a replication of the original curve rotated 90 degrees and shifted by one unit in both x and y directions. Subsequently, the objects are indexed using both curves. Applying a rotation operator substantially improves KNN query results compared to the shift operation. Conversely, applying the shift operator to an original curve reduces the server throughput by decreasing the number of query runs while the rotation operation does not significantly affect the efficiency of our range query processing algorithm.

Figure 11:
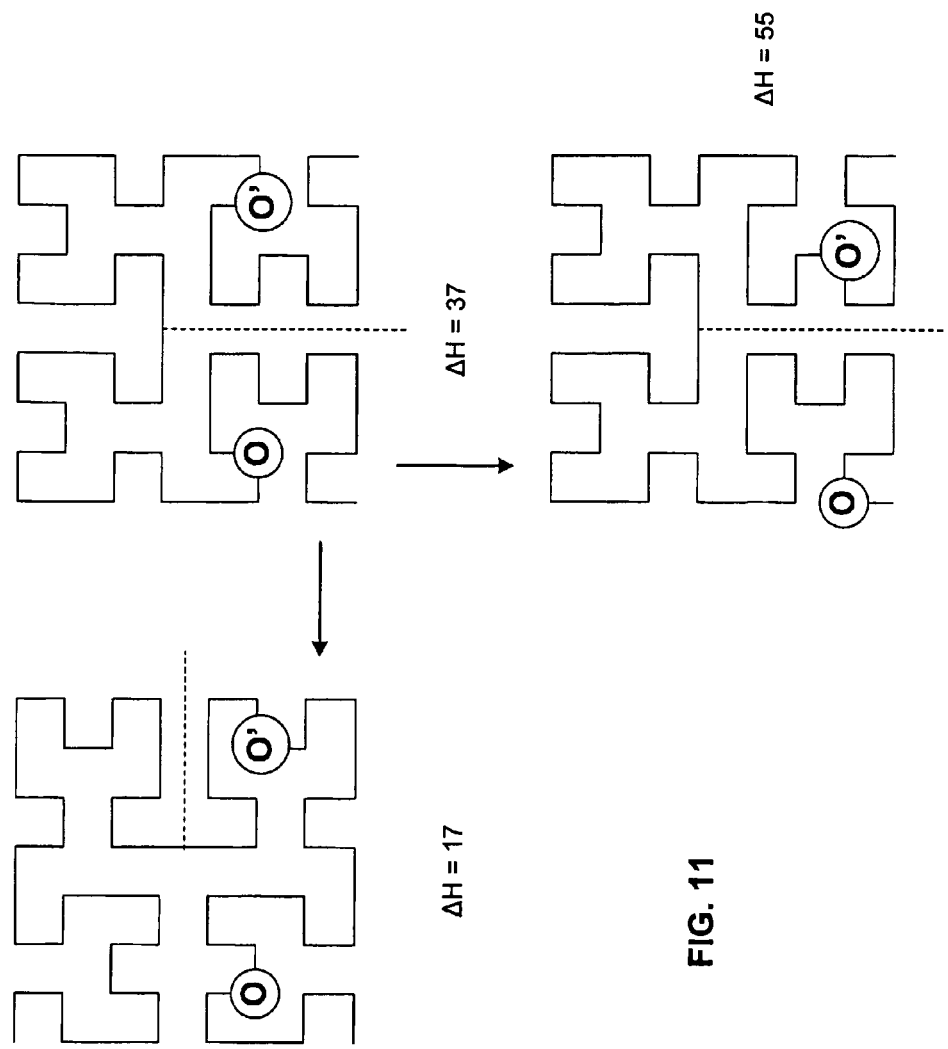
FIG. 11 shows proximity in the original curve vs. rotated and shifted dual curves.

The rotation operator has a positive effect on KNN query evaluation because, by rotating the degree N curve, all lower degree curves constructing the main curve will also be rotated. At each curve order, the curve rotation ensures that the missed sides generated by the discontinuation of the curve, for example, the missed sides between points a and d in FIG. 10A will be covered by the rotated curve. Therefore, the points deemed spatially far from each other in one curve will be indexed correctly in the other curve. This addresses the first issue of using a single Hilbert curve for KNN queries. A rotated dual curve transforms the 2-D space to two 1-D spaces. Thus, each point will now have two nearest neighbors in each curve. These two neighbor pairs can, and often do, have overlaps. That is one reason why the dual curve approach generates significantly more accurate approximate answers. Although a shifted-only dual curve can also cover many gaps in the original curve, it cannot solve the first shortcoming discussed for KNN queries because a one unit shift cannot bring objects with large H-value differences closer to each other in the dual curve as a shift does not change the curve orientation. See, for example, FIG. 11 that shows proximity in the original curve (top right) vs. the Rotated (top left) and Shifted (bottom right) dual curves.

Since applying the rotation operator on the dual curve does not significantly change the number of quadtree blocks, and thus the number of query runs, the effect of the shift operator on the number of query runs alone is studied. Shifting the original curve with the translation vector (1, 1) can cause the strips with maximal blocks of size 1×1 to disappear. In some scenarios, a shifted curve may remove some strips around the range query while introducing new ones. It can be verified that the above scheme will reduce the total number of maximal blocks in almost 5/16 of the cases for square range queries. Similar improvements can be achieved for arbitrary rectangular range queries. This ratio can be gained by considering the 16 possible configurations of even or odd numbers representing a window query's x, y, $n_1$, and $n_2$ values. Therefore, using a shifted and rotated dual curve, we can reduce the number of maximal blocks of a range query which causes a decrease in the number of query runs.

Offline Space Encryption for DCQR

Using the dual curve, the query processing discussed previously can also be modified to work with DCQR as explained below. These modifications may only change the query computation and communication complexities by a constant factor. During the offline phase, it can be assumed that the entire static objects set is located inside a square S1. Consequently, two Hilbert curves $H_2^N$ and $H'_2^N$ are constructed based on SDK and visiting each point. H and H' will compute v(X, Y) and v'(X, Y), respectively. After this process is performed once for all objects, the two sequences of H and H'-values will form two separate look-up tables LUT and LUT'.

Online Query Processing for DCQR

While evaluating KNN queries, for each query point q, H v($X_g$, $Y_q$) and H'=v'($X_q$, $Y_q$) are computed using SDK and SDK', respectively. Two parallel query resolution schemes are simultaneously initiated using both LUT and LUT', to retrieve K closes matches for each curve separately. The two result sets are decoded and the K best candidates are chosen based on their Euclidean distance to q. As for a range query, two parallel queries are generated, one for each curve and the one that results in less number of runs is selected. Further, with regard to complexity, knowing the first curve's SDK enables deriving the key for the second curve. For the second curve, the curve order and scale factor are the same while curve orientation and starting point are shifted by one unit in each direction and are rotated 90 degrees. Therefore, the complexity of finding DCQR's keys does not differ from the previously derived a single curve approach.

Proposed End-to-End Architecture

Figure 12:
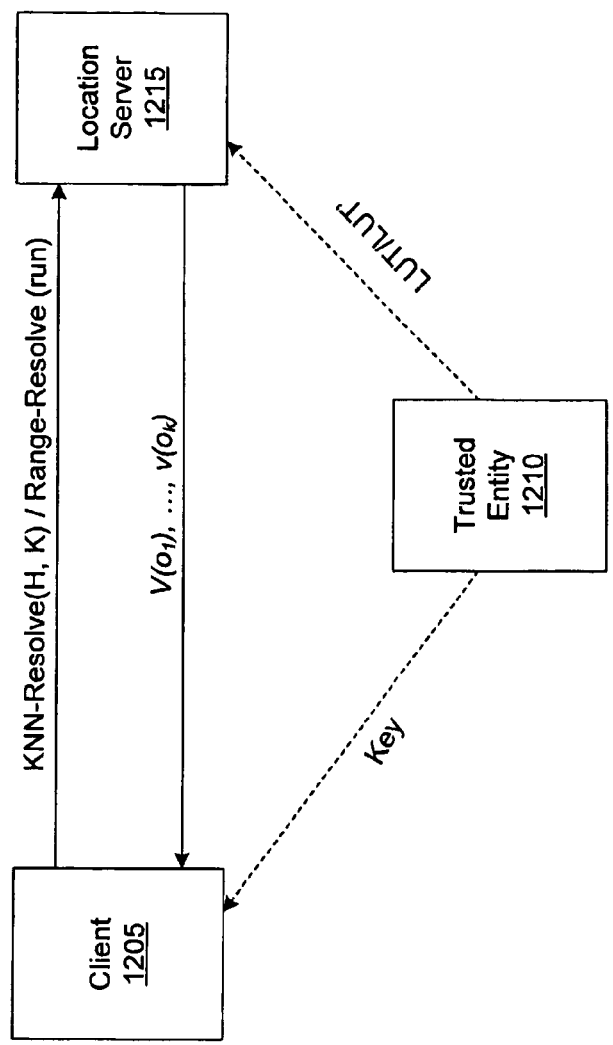
FIG. 12 is a schematic of an example of a DCQR architecture for spatial query processing.

FIG. 12 is a schematic of an example of a DCQR architecture for spatial query processing. The client 1205 can be any portable device, for example, cellular phone, personal digital assistant (PDA), and the like, and can issue a spatial query. The client 1205 can provide parameters necessary for each query type. FIG. 1 details the offline indexing and online query processing of a spatial query in order to make the location server 1215 privacy-aware. A trusted entity 1210 is added to the architecture to perform the CreateIndex module once and to create and populate LUT and LUT' with POI's encoded information. A second functionality of the trusted entity is to provide users with (SDK, SDK') key pair required to encrypt/decrypt query results. These keys have to be protected on the client side, with a temper-proof hardware to prevent malicious users from obtaining the key and sharing it with an adversary or the server 1215. Finally, the trusted entity provides the location server with the two look-up tables LUT and LUT' instead of the original data set and keeps the key pair secret from the location server 1215. The trusted entity performs the above actions offline and thus is not involved in the online query processing scheme. If new users join the system, they can obtain the key pairs from any of the existing users in the system using any secure key management scheme. Note that a malicious user would not deliberately send a molested key to another user because the new user would simply quit the system after receiving incorrect query results.

Depending on the query type, users may invoke different modules discussed above. For KNN queries, users can perform the KNN-Generate module and use the key pair embedded in their tamper-proof devices to decrypt the result set returned to them from the location server and get back the location of the returned points. Similarly, for range queries, users can invoke the Range-Generate module which breaks a range query into several runs each calling the RangeResolve module. Furthermore, in order to remain anonymous, each user can establish a new session which acts as a pseudonym for the client 1205 to communicate with the server 1215 during the course of each KNN query or each RangeResolve request sent for a range query. For KNN (range) queries, the server 1215 performs the KNN-resolve (RangeResolve) module to construct two result sets containing objects of a query run, and returns them to the user.

Experimental Evaluation

Experiments are performed on three different datasets: (i) a synthetically generated uniform dataset; (ii) a real-world dataset of restaurants obtained from NAVTEQ (www.navteq.com) covering a 26 mile by 26 mile area surrounding the city of Los Angeles; and (iii) a synthetically generated skewed dataset where 99% of the objects form four Gaussian clusters (with 6=0:05 and randomly chosen centers) and the other 1% of the objects uniformly distributed. All three datasets contain around 10000 objects (n=10000). Experiments were carried out on an Intel P4 3:20 GHz with 2 GB of RAM and are implemented in Java.

Choosing the Right Curve Order (N)

Figure 13:
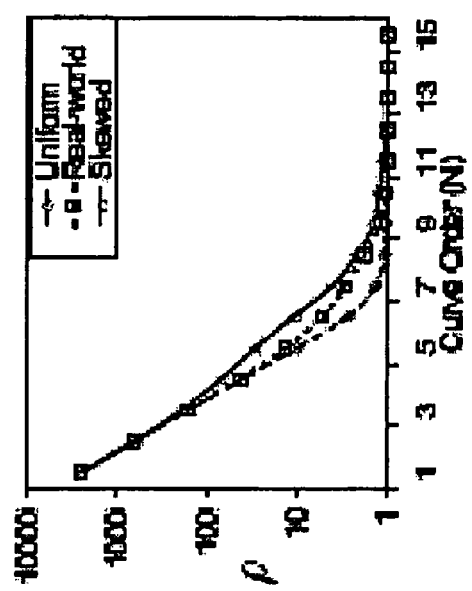
FIG. 13 shows how p changes with N and reaches 1 for $N \geq 13$.

The effectiveness of the described indexing technique was evaluated by analyzing the curve behavior for different values of N, i.e., curve order, and choosing the right value for all the experiments. Using two $H_2^N$ curves for indexing objects, the average number of objects which are assigned the same H-value, i.e., ρ, are measured for each value of N for three datasets. Ideally, ρ≈1. For a dataset of 10000 objects, N log(n)⁻13 results in ρ≈1. FIG. 13 shows how p changes with N and reaches 1 for N≧13. For the remaining experiments, N=13.

KNN Query Evaluation

Figure 14:
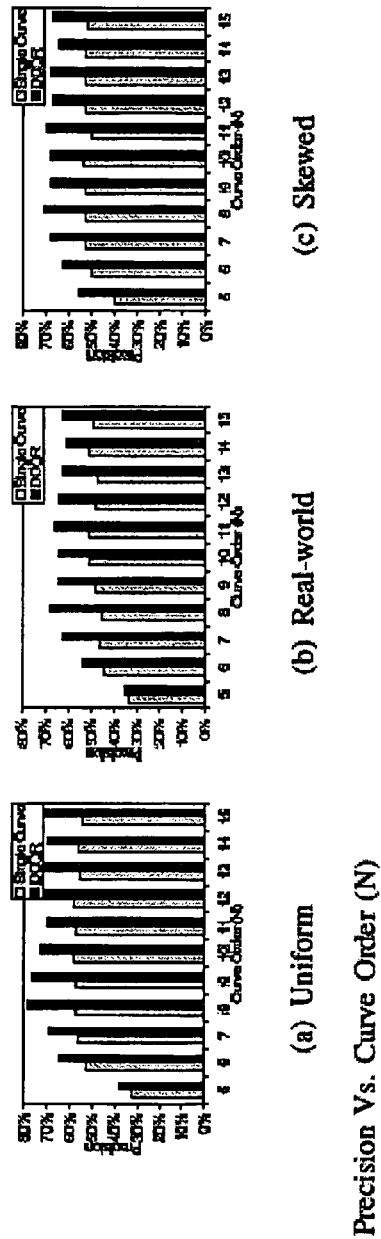
FIG. 14 shows that DCQR results in an average 15% improvement in precision over the single curve approach.
Figure 15:
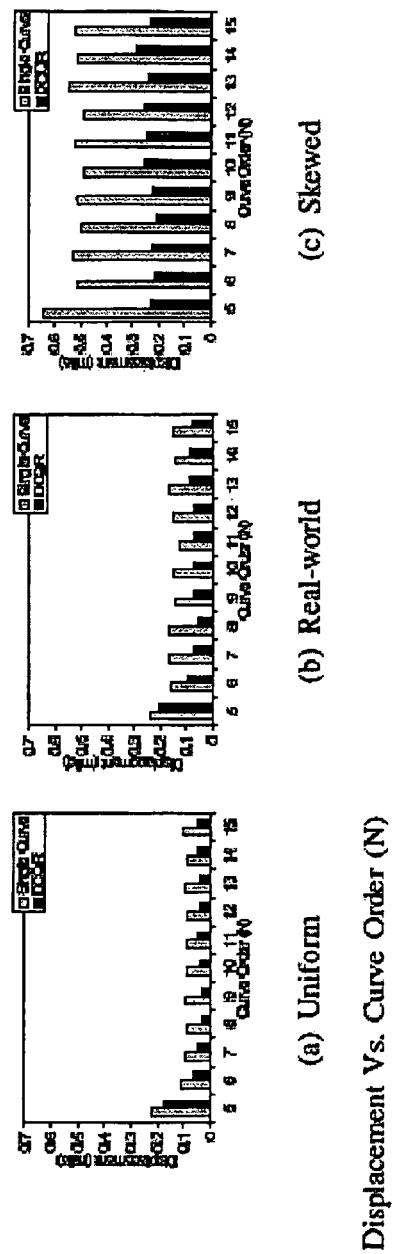
FIG. 15 illustrates how DCQR reduces the displacement error by 50% for all three datasets.

The performance of the KNN query processing algorithm for different values of N and K are evaluated by comparing the single curve approach against DCQR. Each experiment is performed for 1000 randomly generated KNN queries and the results are averaged. FIG. 14 shows that DCQR results in an average 15% improvement in precision over the single curve approach. It can also be seen from FIG. 14 that the precision quickly reaches 70% for N=8, i.e., ρ<2, and slightly oscillates for larger values of N. As expected, the uniform dataset achieves slightly higher precision compared to the real-world and skewed datasets. FIG. 15 illustrates how DCQR reduces the displacement error by 50% for all three datasets. Also, as expected, the DCQR displacement is higher in the skewed dataset. The displacement is a more reasonable measure for KNN query evaluation compared to the precision because it shows how close the query results are approximated rather than just showing the percentage of exact neighbors in the result set. For instance, even a 0% precision with 0.05 mile displacement means that although no exact match for the query is found, each approximate result is less than 0.05 mile farther from the query point than the actual result.

Figure 16:
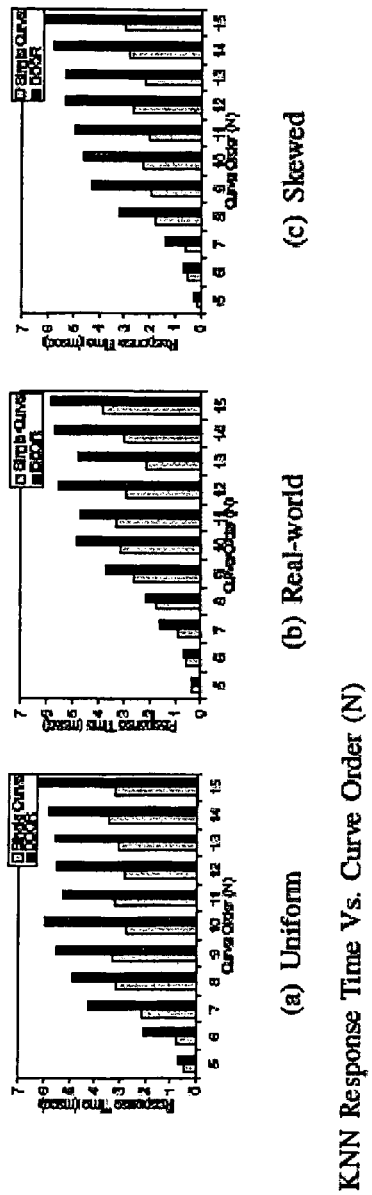
FIG. 16 illustrates that the overhead stays less than 2 milliseconds on average for the three datasets.
Figure 17:
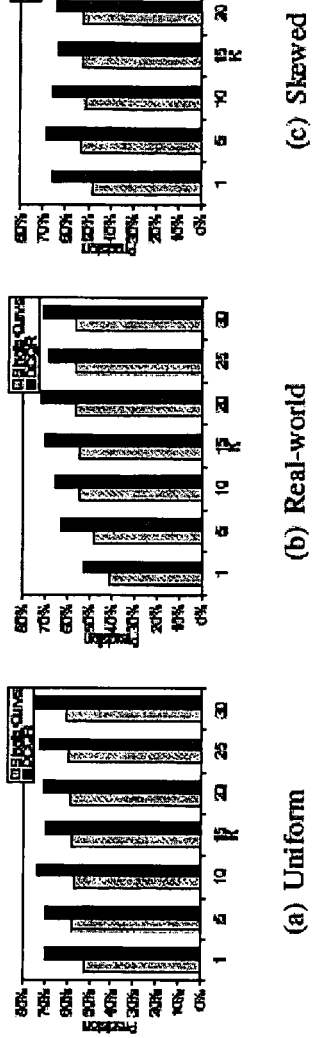
FIG. 17 illustrates DCQR improves precision by more than 25% for all three datasets averaging 67%.
Figure 18:
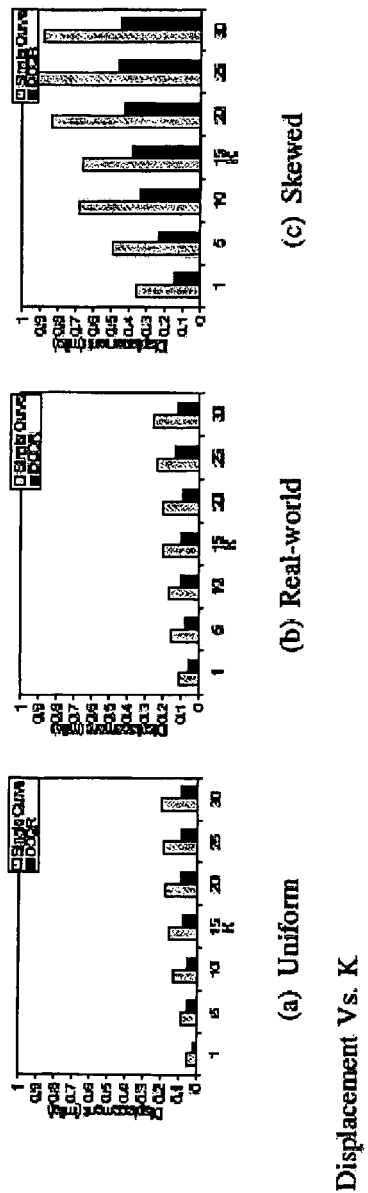
FIG. 18 shows that the displacement increases linearly with K while DCQR results in more than 50% error reduction.
Figure 19:
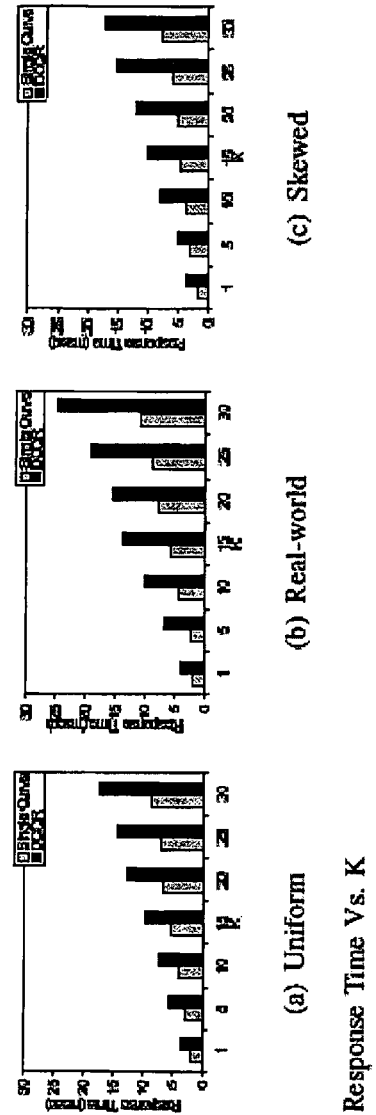
FIG. 19 shows how response time linearly grows with K.

Finally, the DCQR overhead in overall query response time was measured. FIG. 16 illustrates that the overhead stays less than 2 milliseconds on average for the three datasets. Also, the response time increases as N grows until $\rho \approx 1$ for $N \sim 13$. Then, the response time stays around 6 milliseconds for all $N \geq 13$ across all three datasets. In the next set of experiments, the effect of varying K and fixing curve order at 13 on KNN query processing is studied. FIG. 17 illustrates DCQR improves precision by more than 25% for all three datasets averaging 67%. The displacement also increases linearly with K while DCQR results in more than 50% error reduction, as shown in FIG. 18. Similar to the former set of experiments, the skewed dataset results in relatively larger displacements compared to the other datasets. Further, FIG. 19 shows how response time linearly grows with K, confirming the query complexity derivation. The overhead caused by DCQR is less than 6 milliseconds on average for all three datasets.

Range Query Evaluation

Figure 20:
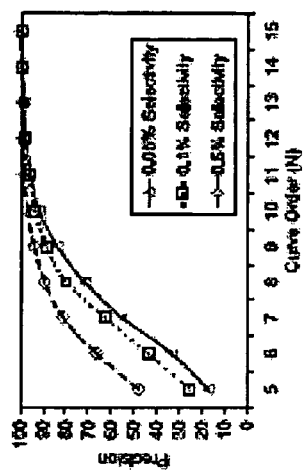
FIG. 20 shows the effect of Hilbert, curve order on the value of precision for the real world dataset.

The performance of the range query algorithm with the single curve and DCQR approaches are studied. In contrast to KNN blind evaluation, the range query evaluation provides exact results. However, the query result set may include some excessive objects that should be filtered out by the user. It is desirable to minimize the number of these excessive objects. The effect of Hilbert curve order (N) and the range query size on the number of excessive objects is demonstrated. The percentage of objects falling in the range out of all objects retrieved is used as the precision to quantify the amount of excessive objects. FIG. 20 shows the effect of Hilbert curve order on the value of precision for the real world dataset. This effect is evaluated for four different square range queries with the selectivity of 0.05%, 0.1%, and 0.5%. Increasing the value of curve order results in higher precision values, reaching almost 1 for $N \geq 13$. Very similar trends were observed with the other two datasets.

The second observation is that for a given N, larger range queries achieve better precision. This is because the excessive objects can only be in the grid cells which partially overlap with the range query. Clearly, the number of such cells is proportional to the perimeter of the range query. On the other hand, the number of objects retrieved from the location server is on average proportional to the area of the query. Therefore, increasing the query side length increases the total number of retrieved objects more than the number of excessive objects. As our second set of experiments we evaluate the effect of Hilbert curve order on the average number of query runs. It is desirable to have a small number of runs to reduce the number of requests to the server and hence increase the server throughput.

Figure 21:
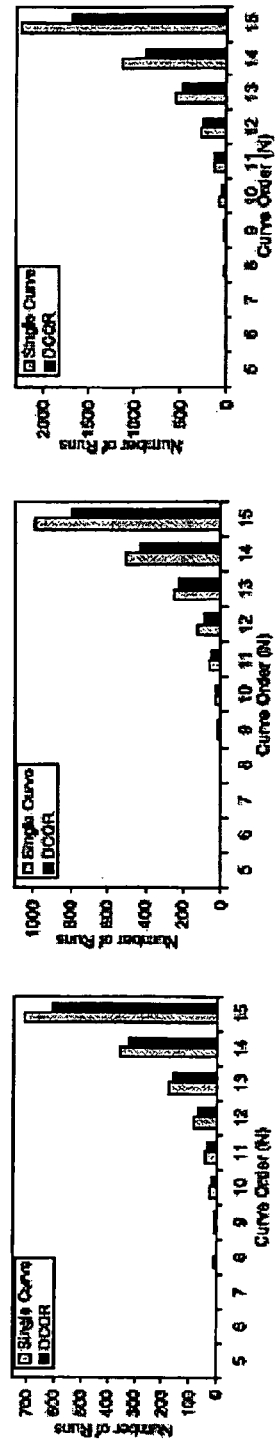
FIG. 21 shows the average number of runs for 1000 range queries over the real-world dataset.

FIG. 21 shows the average number of runs for 1000 range queries over the real-world dataset with the selectivity of 0.05%, 0.1%, and 0.5%. For both original and DCQR approaches, as N increases, the average number of query runs increases as well. This is consistent with the fact that the average number of query runs is linearly proportional with the query side length in terms of the number of grid cells. Considering different curve orders for a specific query size in FIG. 21, an average improvement of around 21% is obtained when DCQR approach is used over original curve. Clearly larger range queries have more runs. Note that the average number of runs is independent from the dataset type and only depends on the coordinates of the query.

FIG. 22 show the running time of the range query algorithms. The running time of both original and DCQR approaches for different Hilbert curve orders for the real data set with four different query sizes are shown in FIG. 22. For a fixed query side length, increasing the value of curve order increases the running time. This is consistent with the range query complexity. Also, the overhead of DCQR approach is marginal compared to the original approach (around 6 milliseconds on average). This is important since it confirms the fact that DCQR can be used to evaluate a range query without significant time overhead. Note that both approaches retrieve the same number of objects from the location server and the difference between DCQR and original approach is the step required to find the runs in the dual curve. As the grid becomes more fine-grained, the time to retrieve objects from the location server dominates the time to calculate query runs and hence increases the overhead of DCQR. Similar trends were observed for the other two datasets. Although the distribution of objects varies for different datasets, the number of runs and the average number of objects retrieved for a unique query size are independent from the dataset. Therefore, the running time is almost independent from the data distribution.

DCQR's Vulnerability to Attacks

Another set of experiments empirically evaluates the resilience of the proposed approach against malicious attackers to confirm the hypotheses discussed previously for one-wayness of transformations used in DCQR and the security of SDK based on the following two extreme scenarios. First, it is assumed that the malicious location server capable of becoming a powerful attacker due to access to LUT and LUT', has somehow gained precise knowledge of the values of $X_0$, $\theta$, $\Gamma$, and N, and only needs to find $Y_0$. For each of its guesses $Y'_0$, the location server forms an SDK and performs the KNN-CreateIndex module comparing the resulting LUT (or LUT'). FIG. 23A illustrates the result of launching this attack and the associated similarity values for $|Y_0-Y'_0|=10^{-2}$, $10^{-3}$, $10^{-4}$, and $10^{-5}$ mile, respectively. The location server's best guess is where $|Y_0-Y'_0| \sim 1.5$ cm, which results in a look-up table that is less than 4% similar to LUT. Thus, even by getting very close to real curve parameters, the key cannot be compromised.

FIG. 23B shows a case where the malicious location server knows the exact values of $X_0$, $Y_0$, $\theta$, and N and should only approximate the value of $\Gamma$ with $\Gamma'$. Assuming the location server's guesses obtain $\Gamma/\Gamma' \approx 0.9$, 0.99, 0.999, and 0.9999, respectively, the best case the generated look-up table bears less than 0.4% similarity to LUT again without the location server knowing the subset of points indexed accurately. Therefore, the proposed scheme possess strong robustness against malicious attackers. FIGS. 23A and 23B also show that modifying r changes the assignment of H-values to objects more significantly than changing $X_0$ or $Y_0$.

Figure 24:
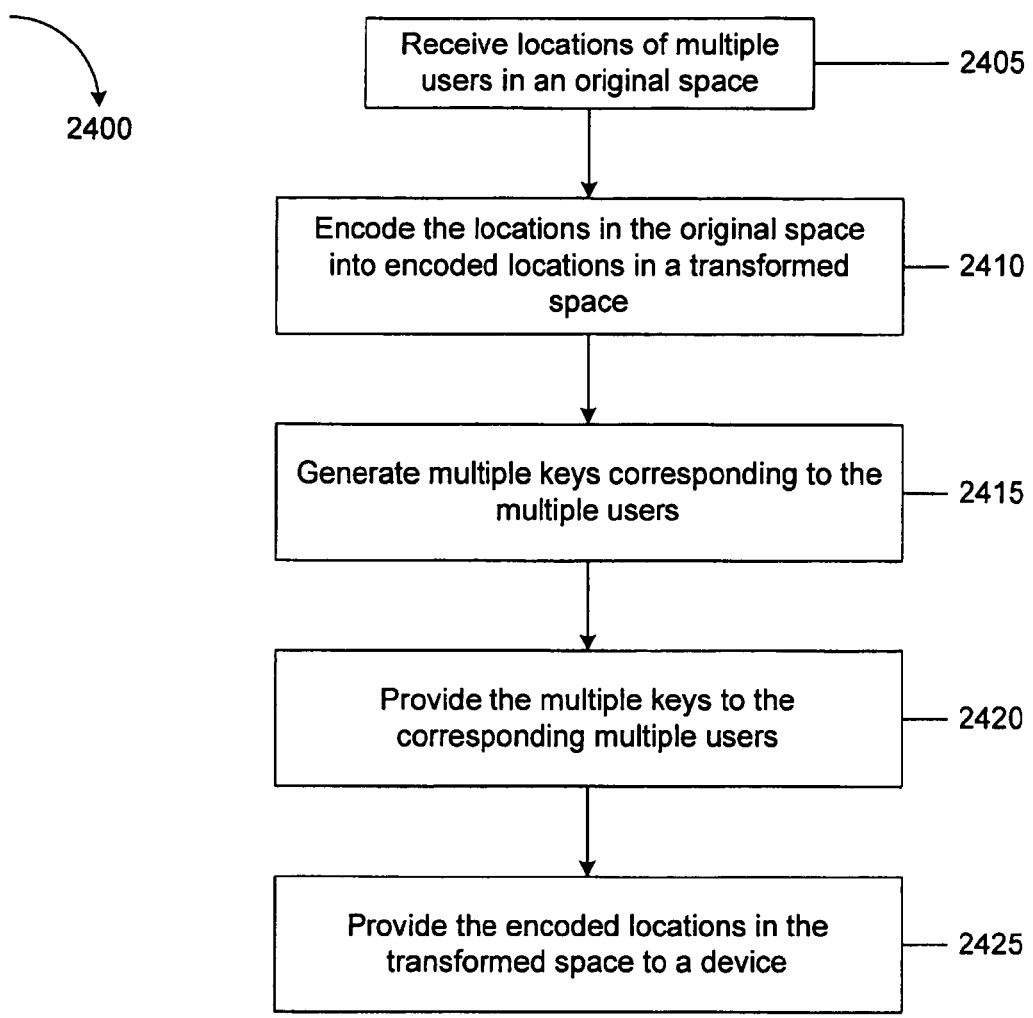
FIG. 24 is a flowchart of an example process for encoding user locations.

FIG. 24 is a flowchart of an example process 2400 for encoding user locations. The process 2400 receives locations of multiple users in an original space (step 2405). A given area can include multiple locations, for example, multiple gas stations. A user can operate a computer system that is also located within the area. The computer system and the multiple gas stations represent multiple users. The location of each user can be specified, for example, using a latitude and a longitude. In some implementations, the latitude and longitude information of the multiple users is obtained from a server that has previously gathered these locations. Alternatively or in addition, the location of a computer system can be obtained from an internet protocol (IP) address of the computer system. In some implementations, a user can be a mobile device, for example, cellular telephone, personal digital assistant (PDA), and the like. Location information of the mobile device can be obtained from a service provider that provides service to the mobile device. The process 2400 can receive all the locations of all the users in an area or the locations of particular users, for example, gas stations only, in the area.

The process 2400 encodes the locations in the original space into encoded locations in a transformed space (step 2410). The transformed space maintains a relative proximity of the locations in the original space. Relative proximity refers, for example, to a distance between two users in the original space and in the transformed space. If two users are close to each other in the original space, then a probability that the two users will be close to each other in the transformed space is high. For example, if a distance between the users in the original space is identical to that in the transformed space, then the probability is 100%. In a worst case scenario, a distance between two points in a transformed space can be four times a distance between the same two points in the original space. In some implementations, the encoding scheme can use space filling curves, for example, Hilbert curves as discussed previously. In such schemes, the probability that the relative proximity of the encoded locations in the transformed space to the locations in the original space is maintained is high.

The process 2400 generates multiple keys corresponding to the multiple users (step 2415). The encoding scheme is a one-way transformation. This means that the computational resources required to obtain a reverse transformation is significantly higher than those required for the transformation from the original space into the transformed space. In implementations where the transformation is performed using a Hilbert curve, the computational complexity for performing a reverse-transformation from the transformed space into the original space, in the absence of a key, is $O(2^{3N})$, where N is a curve order of the Hilbert curve. In operation, a query to identify nearest neighbors from one of the multiple users is resolved in the transformed space by a server. The results that are provided to the user who provided the query are also in the transformed space. The user needs a key to enable a reverse transformation from the transformed space to the original space. Such a transformation is not possible in the absence of the key. This prevents malicious attackers, which may be the server that resolved the query, from detecting original locations of the user who provided the query. In encoding schemes that use a Hilbert curve to encode the locations from the original space to the transformed space, each of the multiple keys are the SDK described previously, and can be generated based on the starting point of the user, Hilbert curve orientation, Hilbert curve order, and Hilbert curve scale factor.

The process 2400 provides the multiple keys to the corresponding multiple users (step 2420). For example, each generated key can be transmitted to the user. In some implementations, the multiple keys can be identical to each other. Thus, each user receives the same key. Further, each generated key can be stored in a secure location of the user to prevent other malicious users from accessing a user's key. For example, if the user is a cellular telephone, the key can be stored in the telephone's secure location. In some implementations, the keys that enable a reverse transformation of the encoded locations can be generated and provided to each user during a pre-processing phase for each user within an area. Subsequently, query resolution can be performed.

The process 2400 provides the encoded locations in the transformed space to a device (step 2425). For example, the device is a server configured to resolve a query received from a user. When the user provides a query to identify nearest neighbors to the device, the device receives the user's encoded location along with encoded locations of all the users in an area. The device identifies nearest neighbors based on the encoded locations. Upon identifying the nearest neighbors, the device transmits the results, including the nearest neighbor locations in the transformed space, to the user. The user uses the key to reverse-transform the encoded locations to identify the neighbors in the original space.

Figure 25:
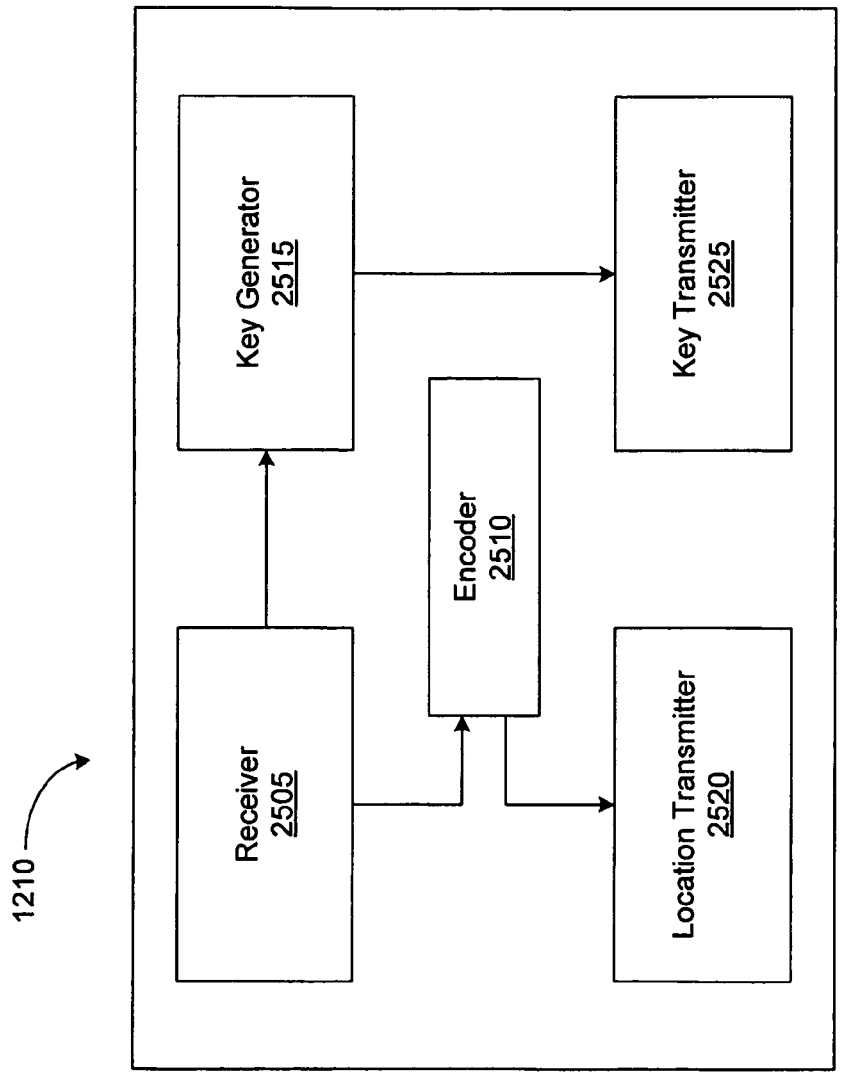
FIG. 25 is an example trusted entity.

FIG. 25 is an example trusted entity 1210 shown in FIG. 12. The trusted entity 1210 includes a receiver 2505 to receive multiple locations of multiple users, an encoder 2510 to encode the locations from an original space to a transformed space, a key generator 2515 to generate multiple keys, a location transmitter 2520 to transmit the encoded locations to a server configured to resolve the query, and a key transmitter 2525 configured to transmit the keys to the multiple users. The trusted entity 1210 is configured to perform operations described with reference to FIG. 24. In some implementations, the trusted entity 1210 can be implemented as software modules written using server side programming languages, for example, C, Java, and the like. In other implementations, the trusted entity 1210 can be implemented as hardware, firmware, and the like.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the specification have been described. Other implementations are within the scope of the following claims. For example, the actions recited in the claims can be performed in a different order and still achieve desirable results. Although Hilbert curves are described as example space filling curves, any space filling curve can be used. Further, increasing a number of Hilbert curves can improve the results. The two curves used for query resolution in the DCQR processes need not be perpendicular to each other, but can have other relative orientations. The server can be configured to process multiple queries from multiple users in parallel.

What is claimed is:

1. A method comprising:
receiving locations of a plurality of users in an original space;
encoding, by a computer, the locations in the original space into encoded locations in a transformed space using a transformation parameter, wherein a relative proximity of the locations in the original space is maintained in the transformed space after the encoding;
generating a plurality of keys corresponding to the plurality of users, each key including the transformation parameter used to encode the locations and enabling a reverse transformation of an encoded user location in the transformed space to an original user location in the original space;
providing the plurality of keys to the corresponding plurality of users; and
providing the encoded locations in the transformed space to a device, wherein an order of computations required to reverse transform the encoded locations in the transformed space to the locations in the original space in the absence of one of the plurality of keys is greater than a computational threshold.

2. The method of claim 1, further comprising storing the encoded locations in the transformed space.

3. The method of claim 2, wherein providing the encoded locations in the transformed space to the device comprises providing the device access to the stored encoded locations.

4. The method of claim 1, wherein the relative proximity of the locations is maintained in the transformed space when a probability that a proximity of the encoded locations in the transformed space is the same as a proximity of the locations in the original space is high.

5. The method of claim 1, wherein providing the plurality of keys to the corresponding plurality of users comprises causing the plurality of keys to be stored in corresponding secure locations by the plurality of users.

6. The method of claim 1, wherein the plurality of keys is are multiple copies of the same key.

7. The method of claim 1, further comprising encoding the locations in the original space into encoded locations in the transformed space using Hilbert curves.

8. The method of claim 7, wherein the computational threshold is proportional to a curve order of the Hilbert curves.

9. The method of claim 7, further comprising generating the plurality of keys based on starting points, Hilbert curve orientation, Hilbert curve order, and Hilbert curve scale factor.

10. A system comprising:
   means for receiving locations of a plurality of users in an original space;
   means for encoding the locations in the original space into encoded locations in a transformed space using a transformation parameter, wherein a relative proximity of the locations in the original space is maintained in the transformed space after the encoding;
   means for generating a plurality of keys corresponding to the plurality of users, each key including the transformation parameter used to encode the locations and enabling a reverse transformation of an encoded user location in the transformed space to an original user location in the original space;
   means for providing the plurality of keys to the corresponding plurality of users; and
   means for providing the encoded locations in the transformed space to a device, wherein an order of computations required to reverse transform the encoded locations in the transformed space to the locations in the original space in the absence of one of the plurality of keys is greater than a computational threshold.

11. The system of claim 10, further comprising means for storing the encoded locations in the transformed space.

12. The system of claim 11, wherein the means for providing the encoded locations in the transformed space to the device comprises means for providing the device access to the stored encoded locations.

13. The system of claim 10, wherein the relatively proximity of the locations is maintained in the transformed space when a probability that a proximity of the encoded locations in the transformed space is the same as a proximity of the locations in the original space is high.

14. The system of claim 10, wherein the means for providing the plurality of keys to the corresponding plurality of users comprises means for causing the plurality of keys to be stored in corresponding secure locations by the plurality of users.

15. The system of claim 10, wherein the plurality of keys are multiple copies of the same key.

16. The system of claim 10, further comprising means for encoding the locations in the original space into encoded locations in the transformed space using Hilbert curves.

17. The system of claim 16, wherein the computational threshold is proportional to a curve order of the Hilbert curves.

18. The system of claim 16, further comprising means for generating the plurality of keys based on starting points, Hilbert curve orientation, Hilbert curve order, and Hilbert curve scale factor.

19. A system comprising:
   an encoding device configured to
      encode locations of a plurality of users in an original space into encoded locations in a transformed space using a transformation parameter,
      generate a key that includes the transformation parameter used to encode the locations, the key to enable a reverse transformation of an encoded user location in the transformed space to an original user location in the original space,
      provide the key to each user of the plurality of users, and
      provide the encoded locations in the transformed space; and
   a server configured to
      receive the encoded locations in the transformed space,
      receive a query from a user to identify one or more nearest users, the user and the one or more nearest users included in the plurality of users,
      resolve the query to identify encoded locations in the transformed space of the one or more nearest users based on an encoded location in the transformed space of the user, and
      provide the identified encoded locations to the user.

20. The system of claim 19, wherein the query is a K-nearest neighbor (KNN) query, and wherein the server is configured to resolve the KNN query using a Hilbert curve.

21. The system of claim 19, wherein the query is a two-dimensional (2-D) range query, and wherein the server is configured to resolve the 2-D range query by transforming the 2-D range query into a plurality of one-dimensional (1-D) ranges in the transformed space.

22. The system of claim 19, wherein the server is configured to resolve the query using a dual curve obtained by replicating a Hilbert curve.

23. The system of claim 22, wherein the Hilbert curve is rotated and shifted to obtain the dual curve.

24. The system of claim 23, wherein the Hilbert curve is rotated by 90 degrees.

25. The system of claim 17, wherein the Hilbert curve is shifted by one unit in both X and Y directions.

* * * * *

UNITED STATES PATENT AND TRADEMARK OFFICE
CERTIFICATE OF CORRECTION

| | |
|---|---|
| PATENT NO. | : 8,099,380 B1 |
| APPLICATION NO. | : 12/129629 |
| DATED | : January 17, 2012 |
| INVENTOR(S) | : Cyrus Shahabi et al. |

It is certified that error appears in the above-identified patent and that said Letters Patent is hereby corrected as shown below:

In column 22, line 60: Please delete "is".

Signed and Sealed this
Twenty-seventh Day of March, 2012

David J. Kappos
*Director of the United States Patent and Trademark Office*